United States Patent
Kirby et al.

[11] 3,887,472
[45] June 3, 1975

[54] CYCLIC OXIME DERIVATIVES

[75] Inventors: Peter Kirby, Maidstone; Eirlys R. Isaac, Stittingbourne; Graham C. Smith, Ramsgate, all of England

[73] Assignee: Shell Oil Company, Houston, Tex.

[22] Filed: Nov. 24, 1972

[21] Appl. No.: 309,566

[30] Foreign Application Priority Data
Nov. 29, 1971 United Kingdom............... 55319/71

[52] U.S. Cl. .......... 260/340.7; 260/340.9; 424/278; 71/88
[51] Int. Cl.. C07d 15/04; C07d 13/08; C07d 13/02
[58] Field of Search...................... 260/340.7, 340.9

[56] References Cited
FOREIGN PATENTS OR APPLICATIONS
37-7239   7/1962   Japan............................. 260/340.7

*Primary Examiner*—Henry R. Jiles
*Assistant Examiner*—Robert T. Bond

[57] ABSTRACT

Cyclic oxime derivatives of the isomeric formulae

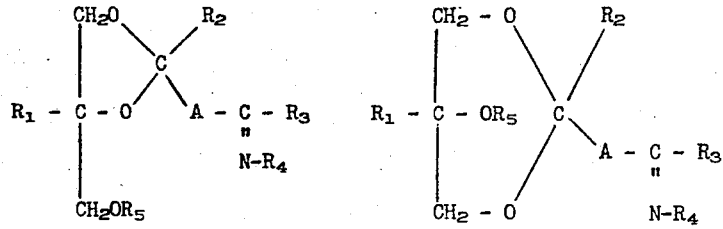

wherein $R_1$, $R_2$, $R_3$ and $R_4$ have the respective meanings set out in the specification following, these derivatives being useful as herbicides.

7 Claims, No Drawings

CYCLIC OXIME DERIVATIVES

DESCRIPTION OF THE PRIOR ART

A search of the prior art has indicated that the herbicidal oxime deriatives of this invention are novel.

DESCRIPTION OF THE INVENTION

The present invention relates to cyclic oxime derivatives having one or the other of the following isomeric formulae:

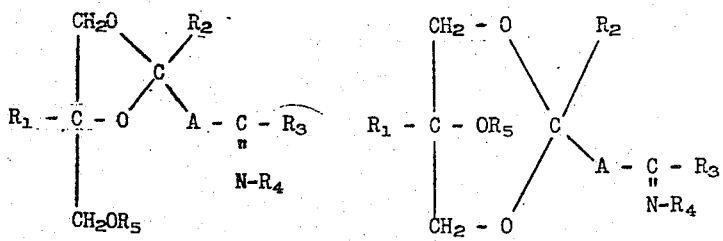

wherein $R_1$ and $R_2$ each represents an alkyl group; $R_3$ represents a hydrogen atom or an alkyl, acyl or phenyl group, or $R_2$ and $R_3$ together represent a polymethylene group; $R_4$ represents a hydroxy group or an alkali metal salt thereof, an alkoxy group optionally substituted by a cyano, alkoxy or acyl group, an alkynyloxy group an acyloxy group, a benzyloxy group, or an amino group substituted by one or two alkyl groups or by an acyl or dinitrophenyl group; $R_5$ represents a benzyl group optionally substituted by one or more halogen atoms or by an alkyl group; and A represents a covalent bond or a methylene group. The term "acyl" is used herein in its broadest sense to denote a group formed by the removal of a hydroxyl group from an organic acid, and includes therefore not only groups derived from carboxylic or thiocarboxylic acids, such as alkanoyl or optionally N-substituted carbamoyl or thiocarbamoyl groups, but also groups derived from substituted carbonic acids, such as alkoxycarbonyl groups.

Preferred carbonyl derivatives are those compounds of formula I wherein $R_1$ and $R_2$ each represents an alkyl group of 1–6 carbon atoms, for example methyl or ethyl; $R_3$ represents a hydrogen atom, an alkyl or alkoxycarbonyl group of up to 6 carbon atoms, for example methyl or ethoxycarbonyl, or a phenyl group, or $R_2$ and $R_3$ together represent a polymethylene group of up to 5 carbon atoms, for example trimethylene; $R_4$ represents a hydroxy group or a sodium salt thereof, an alkoxy group of 1–6 carbon atoms, for example methoxy, optionally substituted by a cyano group, by an alkoxy or alkoxycarbonyl group of up to 6 carbon atoms, for example by methoxy or methoxycarbonyl, or by an N-phenylcarbamoyl group, an alkynyloxy or alkahoyloxy group of up to 6 carbon atoms, for example propynyloxy or acetoxy, a carbamoyloxy, group mono-N-substituted by an alkyl or alkenyl group of up to 6 carbon atoms, for example by methyl, ethyl or propenyl, or by a dihalophenyl group, for example by dichlorophenyl, a benzyloxy group, or an amino group substituted by two alkyl groups each of 1-6 carbon atoms, for example methyl or by a thiocarbamoyl, benzoyl or dinitrophenyl group; $R_5$ represents a benzyl group optionally substituted by two chlorine atoms or by an alkyl group of 1–6 carbon atoms, for example by methyl; and A represents a covalent bond or a methylene group, or compounds of formula II wherein $R_1$ and $R_2$ each represents an alkyl group of 1–6 carbon atoms, for example methyl; $R_3$ represents an alkyl or alkoxycarbonyl group of up to 6 carbon atoms, for example methyl or ethoxycarbonyl, or a phenyl group; $R_4$ represents a hydroxy group; $R_5$ represents a benzyl group; and A represents a covalent bond.

The following compounds are particularly preferred:
2-acetyl-4-benzyloxymethyl-2,4-dimethyl-1,3-dioxolane oxime,
2-acetyl-4-benzyloxymethyl-2,4-dimethyl-1,3-dioxolane O-methyloxime, and
2-acetyl-4-benzyloxymethyl-4-ethyl-2-methyl-1,3-dioxolane oxime It will be appreciated that the carbonyl derivatives of the invention may exhibit geometrical and optical isomerism. The individual isomers together with mixtures thereof are included within the scope of the invention.

The compounds wherein $R_4$ represents a hydroxy group or substituted amino group are prepared by a process which comprises reacting a diol of formula:

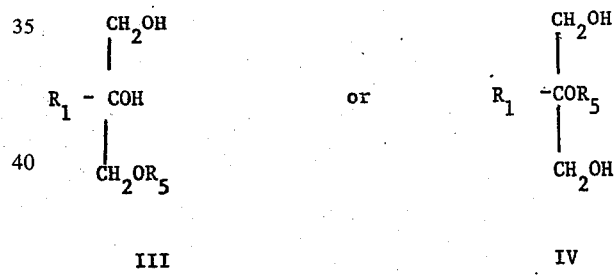

with a dione derivative of formula:

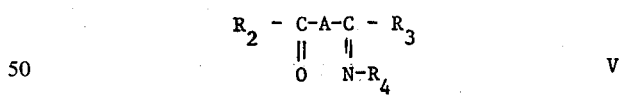

in the presence of an acid catalyst, for example p-toluene sulphonic acid. The reaction is preferably carried out in an aromatic hydrocarbon, for example benzene, as solvent.

Those compounds wherein $R_4$ represents an optionally substituted alkoxy group or an alkynyloxy, acyloxy or benzyloxy group are obtained by reacting the corresponding compound wherein $R_4$ represents a hydroxy group with a strong base, for example an alkali metal hydride such as sodium hydride, and a halo compound of formula:

$R_4$ — Hal VI wherein Hal represents a halogen, suitably chlorine, bromine or iodine, atom. The reaction is preferably carried out in a polar organic solvent, for example tetrahydrofuran or dimethylformamide. If desired, the alkali metal salt formed in the first stage of the process may be isolated from the reaction mixture.

When $R_4$ represents a mono-N- substituted carbamoyloxy group the compounds may alternatively be prepared by reacting the corresponding compound wherein $R_4$ represents a hydroxy group with an isocyanate, suitably in the presence of a tertiary amine such as triethylamine.

As mentioned above the carbonyl derivatives of the invention are of interest as herbicides, and in particular as herbicides for the pre-emergence control of grass weeds. The invention includes therefore herbicidal compositions comprising carrier or a surface-active agent, or both a carrier and a surface-active agent, together with, as active ingredient, at least one compound of the invention. Likewise the invention includes also a method of combating undesired plant growth at a locus which comprises applying to the locus a herbicidally effective amount of a compound or composition of the invention.

The term 'carrier' as used herein means a solid or fluid material, which may be inorganic or organic and of synthetic or natural origin, with which the active compound is mixed or formulated to facilitate its application to the plant, seed, soil or other object to be treated, or its storage, transport or handling.

The surface-active agent may be an emulsifying agent or a dispersing agent or a wetting agent; it may be nonionic or ionic.

Any of the carrier materials or surface-active agents usually applied in formulating pesticides may be used in the compositions of the invention, and suitable examples of these are to be found, for example, in our British Specification No. 1,232,930.

The compositions of the invention may be formulated as wettable powders, dusts, granules, solutions, emulsifiable concentrates, emulsions, suspension concentrates and aerosols. Wettable powders are usually compounded to contain 25, 50 or 75% w of toxicant and usually contain, in addition to solid carrier, 3–10% w of a dispersing agent and, where necessary, 0-10% w of stabiliser(s) and/or other additives such as penetrants or stickers. Dusts are usually formulated as a dust concentrate having a similar composition to that of a wettable powder but without a dispersant, and are diluted in the field with further solid carrier to give a composition usually containing ½-10% w of toxicant. Granules are usually prepared to have a size between 10 and 100 BS mesh (1.676 – 0.152 mm), and may be manufactured by agglomeration or impregnation techniques. Generally, granules will contain ½-25% w toxicant and 0-10% w of additives such as stabilisers, slow release modifiers and binding agents. Emulsifiable concentrates usually contain, in addition to the solvent and, when necessary, co-solvent, 10–50% w/v toxicant, 2–20% w/v emulsifiers and 0–20% w/v of appropriate additives such as stabilisers, penetrants and corrosion inhibitors. Suspension concentrates are compounded so as to obtain a stable, non-sedimenting, flowable product and usually contain 10–75% w toxicant, 0.5 – 15% w of dispersing agents, 0.1 – 10% w of suspending agents such as protective colloids and thixotropic agents, 0 – 10% w of appropriate additives such as defoamers, corrosion inhibitors, stabilisers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersions and emulsions, for example, compositions obtained by diluting a wettable powder or a concentrate according to the invention with water, also lie within the scope of the present invention. The said emulsions may be of the water-in-oil or of the oil-in-water type, and may have a thick 'mayonnaise'-like consistency.

The composition of the invention may also contain other ingredients, for example, other compounds possessing pesticidal, especially insecticidal, acaricidal, herbicidal and fungicidal properties.

The invention is further illustrated in the following examples.

EXAMPLE 1

2-Acetyl-4-benzyloxymethyl - 2,4-dimethyl - 1,3-dioxolane oxime (isomers A and B)

3-Benzyloxy - 2 - methylpropane - 1,2 - diol (20 g), butane - 2,3 - dione monoxime (10 g) and p - toluenesulphonic acid (0.2 g) in benzene (50 ml) were heated together at reflux temperature under a Dean and Stark trap for 16 hours. When a total of 0.8 ml of water had been collected in the trap the solvent was removed from the reaction mixture and the residue was chromatographed on silica gel using a 4:1 mixture of methylene chloride and ether. The product so obtained was shown by IR and NMR spectroscopy to be an isomer mixture. On repeated recrystallisation of this mixture from petroleum ether (b.p. 60°–80°C) pure isomer A was obtained (m.p.83°–84°C).

Analysis

| | |
|---|---|
| Calculated for $C_{15}H_{21}NO_4$ | : C 64.5 ; H 7.6 ; N 5.0 % |
| Found | : C 64.7 ; H 7.4 : N 5.1 % |

The mother liquors from the recrystallisation of the isomer mixture were evaporated to dryness under reduced pressure and the residue was recrystallised from petroleum ether to give a product containing ca.75% isomer B and 25% isomer A (as shown by NMR spectroscopy). Isomer B is characterised by an absorption band at 3380 $cm^{-1}$ in its IR spectrum.

EXAMPLE 2

2 - Acetyl - 4 - benzyloxymethyl - 4 - ethyl - 2 methyl - 1,3 - dioxolane O-(N-ethylcarbamoyl) oxime 2-Acetyl - 4 - benzyloxymethyl - 4- ethyl - 2 - methyl - 1,3 - dioxolane oxime (0.6 g, prepared by a similar method to that of example 1) in methylene chloride (25 ml) was treated with ethylisocyanate (0.2 g) and triethylamine (2 drops). The solvent was then removed under reduced pressure and the residue was taken up in petroleum ether. The solution was decanted from the undissolved triethylamine and evaporated to yield the desired product.

Analysis

| | |
|---|---|
| Calculated for $C_{19}H_{28}N_2O_5$ | : C 62.6 ; H 7.7 ; N 7.7% |
| Found | : C 62.6 ; H 8.0 ; N 7.3% |

EXAMPLE 3

2 - Acetyl - 4 - benzyloxymethyl - 2,4 - dimethyl-1,3 - dioxolane O - proparglyoxime 2 - Acetyl - 4 - benzyloxymethyl - 2,4 - dimethyl - 1,3 - dioxolane oxime 91.49 g, 50/50 isomer mixture prepared as in example 1) was converted to its sodium salt by reaction with sodium hydride (0.12 g) in dimethylformamide (20 ml). Propargyl bromide (0.6 g) was added to the solution of the salt and the mixture was allowed to stand for 16 hours at room temperature. It was then poured into water and extracted with ether. The ethereal extracts were dried and the ether was removed under reduced pressure. The residue was purified by chromatography on silica gel using methylene chloride followed by 4:1 methylene chloride/ether mixture as eluant to yield the desired product.

Analysis

Calculated for $C_{18}H_{23}NO_4$ : C 68.1 ; H 7.3 ; N 4.4%
Found : C 68.3 ; H 7.2 : N 4.2%

EXAMPLE 4

Following procedures similar to those given in examples 1 - 3 further compounds were prepared, whose physical characteristics and analyses are set out in Table 1.

EXAMPLE 5

Herbicidal Activity

To evaluate their herbicidal activity, the compounds of the invention were tested using as a representative range of plants:
maize, *Zea mays* (*Mz*); rice, *Oryza sativa* (*R*); barnyard grass, *Echinchloa crusgalli* (BG); pea, *Pisum sativum* (P); linseed, *Linum usitatissium* (L); mustard, *Sinapis alba* (M); and sugar beet, *Beta vulgaris* (SB).

The tests fall into two categories, pre-emergence and post-emergence. The pre-emergence tests involved spraying a liquid formulation of the compound onto the soil in which the seeds of the plant species mentioned above had recently been sown. The post-emergence tests involved two types of test, viz. soil drench and foliar spray tests. In the soil drench tests the soil in which seedling plants of the above species were growing, was drenched with a liquid formulation containing a compound of the invention, and in the foliar spray tests the seedling plants were sprayed with such a formulation.

TABLE 1

| Compound | Melting point, °C. | Analysis, percent | | C | H | N | Cl |
|---|---|---|---|---|---|---|---|
| 2-acetyl-4-benzyloxymethyl-4-ethyl-2-methyl-1,3-dioxolane oxime | 95-96 | Calculated for $C_{16}H_{23}NO_4$ Found | | 65.5 65.8 | 7.9 8.2 | 4.8 4.7 | |
| 2-acetyl-4-benzyloxymethyl-2,4-dimethyl-1,3-dioxolane O-benzyloxime | Oil | Calculated for $C_{22}H_{27}NO_4$ Found | | 71.5 71.9 | 7.4 7.5 | 3.8 3.5 | |
| 2-acetyl-4-benzyloxymethyl-2,4-dimethyl-1,3-dioxolane O-methyloxime | Oil | Calculated for $C_{16}H_{23}NO_4$ Found | | 65.5 64.4 | 7.9 7.8 | 4.8 4.3 | |
| 2-acetyl-4-benzyloxymethyl-2,4-dimethyl-1,3-dioxolane O-cyanomethyloxime | Oil | Calculated for $C_{17}H_{22}N_2O_4$ Found | | 64.1 63.7 | 7.0 6.9 | 8.8 8.9 | |
| 2-acetyl-4-benzyloxymethyl-2,4-dimethyl-1,3-dioxolane O-(methoxycarbonyl-methyl) oxime. | Oil | Calculated for $C_{18}H_{25}NO_6$ Found | | 61.5 61.0 | 7.2 7.0 | 4.0 3.8 | |
| 2-acetyl-5-benzyloxy-2,5-dimethyl-1,3-dioxane oxime | 146-149 | Calculated for $C_{15}H_{21}NO_4$ Found | | 64.5 64.1 | 7.6 7.7 | 5.0 5.3 | |
| 2-benzoyl-4-benzyloxymethyl-2,4-dimethyl-1,3-dioxolane oxime (isomer A) | 135-138 | Calculated for $C_{20}H_{23}NO_4$ Found | | 70.4 70.8 | 6.8 6.9 | 4.1 4.0 | |
| 2-benzoyl-4-benzyloxymethyl-2,4-dimethyl-1,3-dioxolane oxime (isomer B) | 85-86 | Calculated for $C_{20}H_{23}NO_4$ Found | | 70.4 69.4 | 6.8 6.8 | 4.1 3.8 | |
| Ethyl 2-(4-benzyloxymethyl-2,4-dimethyl-1,3-dioxolan-2-yl)-2-hydroxyiminoacetate. | Oil | Calculated for $C_{17}H_{23}NO_6$ Found | | 60.5 60.9 | 6.9 6.8 | 4.2 4.4 | |
| Ethyl 2-(4-benzyloxymethyl-2,4-dimethyl-1,3-dioxolan-2-yl)-2-methoxyiminoacetate. | Oil | Calculated for $C_{18}H_{25}NO_6$ Found | | 61.5 62.3 | 7.2 7.3 | 4.0 3.9 | |
| Ethyl 2-(4-benzyloxymethyl-2,4-dimethyl-1,3-dioxolan-2-yl)-2-acetoxyiminoacetate. | Oil | Calculated for $C_{19}H_{25}NO_7$ Found | | 60.1 61.0 | 6.6 6.8 | 3.7 3.9 | |
| Ethyl 2-(4-benzyloxymethyl-2,4-dimethyl-1,3-dioxolan-2-yl)-2-(N-methylcarbamoyloxyimino)acetate. | Oil | Calculated for $C_{19}H_{26}N_2O_7$ Found | | 57.9 57.7 | 6.6 6.5 | 7.1 6.7 | |
| 4-benzyloxymethyl-4-methyl-1,3-dioxolane-2-spiro(2-hydroxyiminocyclopentane). | Oil | Calculated for $C_{16}H_{21}NO_4$ Found | | 66.0 66.0 | 7.3 7.2 | 4.8 4.2 | |
| Ethyl 2-(4-benzyloxymethyl-2,4-dimethyl-1,3-dioxolan-2-yl)-2-(N-allylcarbamoyloxyimino)acetate. | Oil | Calculated for $C_{21}H_{28}N_2O_7$ Found | | 60.2 60.1 | 6.7 6.7 | 6.7 7.0 | |
| 4-benzyloxymethyl-2,4-dimethyl-2-formyl-1,3-dioxolane O-(N-methylcarbamoyl)oxime. | Oil | Calculated for $C_{16}H_{22}N_2O_5$ Found | | 59.6 59.8 | 6.9 7.1 | 8.7 8.4 | |
| 4-benzyloxymethyl-2,4-dimethyl-2-formyl-1,3-dioxolane O-methoxymethyloxime. | Oil | Calculated for $C_{16}H_{23}NO_5$ Found | | 62.1 62.2 | 7.5 7.8 | 4.5 4.2 | |
| 4-benzyloxymethyl-2,4-dimethyl-2-formyl-1-3-formyl-1,3-dioxolane O-(N-phenylcarbamoylmethyl)oxime. | Oil | Calculated for $C_{22}H_{26}N_2O_5$ Found | | 66.3 65.1 | 6.6 6.6 | 7.0 6.4 | |
| 4-benzyloxymethyl-2,4-dimethyl-2-(2-oxopropyl)-1,3-dioxolane O-(N-methylcarbamoyl)oxime. | Oil | Calculated for $C_{18}H_{26}N_2O_5$ Found | | 61.7 61.9 | 7.4 7.8 | 8.0 7.6 | |
| 4-benzyloxymethyl-2,4-dimethyl-2-(2-oxopropyl)-1,3-dioxolane O-methyloxime. | Oil | Calculated for $C_{17}H_{25}NO_4$ Found | | 66.5 67.0 | 8.2 8.5 | 4.6 4.0 | |
| 2-acetyl-4-(2,6-dichlorobenzyloxymethyl)-2,4-dimethyl-1,3-dioxolane oxime (isomer mixture). | 75-100 | Calculated for $C_{15}H_{19}NO_4Cl_2$ Found | | 51.8 51.3 | 5.5 5.5 | 4.0 3.9 | 20.4 20.2 |
| 2-acetyl-2,4-dimethyl-4-(2-methylbenzyloxymethyl)-1,3-dioxolane oxime (isomer 1). | Oil | Calculated for $C_{16}H_{23}NO_4$ Found | | 65.5 65.2 | 7.9 7.9 | 4.8 4.8 | |

TABLE 1—Continued

| Compound | Melting point, °C. | Analysis, percent | | | | |
|---|---|---|---|---|---|---|
| | | | C | H | N | Cl |
| 2-acetyl-2,4-dimethyl-4-(2-methylbenzyloxymethyl)-1,3-dioxolane oxime (isomer 2). | Oil | Calculated for $C_{16}H_{23}NO_4$<br>Found | 65.5<br>65.6 | 7.9<br>7.9 | 4.8<br>4.6 | |
| 2-acetyl-4-benzyloxymethyl-2,4-dimethyl-1,3-dioxolane 2,4-dinitrophenylhydrazone (isomer mixture). | Oil | Calculated for $C_{21}H_{24}N_4O_7$<br>Found | 56.8<br>57.9 | 5.4<br>5.9 | 12.6<br>12.0 | |
| 2-acetyl-4-benzyloxymethyl-2,4-dimethyl-1,3-dioxolane dimethylhydrazone | Oil | Calculated for $C_{17}H_{26}N_2O_3$<br>Found | 66.6<br>66.9 | 8.6<br>8.7 | 9.1<br>8.9 | |
| 2-acetyl-4-benzyloxymethyl-2,4-dimethyl-1,3-dioxolane thiosemicarbazone | Oil | Calculated for $C_{16}H_{23}N_3SO_3$<br>Found | 57.0<br>56.8 | 6.9<br>7.0 | 12.5<br>11.8 | |
| 2-acetyl-4-benzyloxymethyl-2,4-dimethyl-1,3-dioxolane benzoylhydrazone | Oil | Calculated for $C_{22}H_{26}N_2O_4$<br>Found | 69.1<br>68.9 | 6.8<br>7.1 | 7.3<br>7.0 | |
| Ethyl 2-(4-benzyloxymethyl-2,4-dimethyl-1,3-dioxolan-2-yl)-2-(N-phenylcarbamoyloxyimino)acetate. | Oil | Calculated for $C_{24}H_{28}N_2O_7$<br>Found | 63.1<br>63.4 | 6.2<br>6.2 | 6.1<br>5.7 | |
| Ethyl 2-(4-benzyloxymethyl-2,4-dimethyl-1,3-dioxolan-2-yl)-2-(N-(2,4-dichlorophenyl)-carbamoyloxyimino)acetate. | Oil | Calculated for $C_{24}H_{26}N_2O_7Cl_2$<br>Found | 54.9<br>51.8 | 5.0<br>4.7 | 5.3<br>4.9 | |
| 2-benzoyl-5-benzyloxy-2,5-dimethyl-1,3-dioxane oxime (isomer mixture) | 148–155 | Calculated for $C_{20}H_{23}NO_4$<br>Found | 70.4<br>70.0 | 6.8<br>6.6 | 4.1<br>3.8 | |
| 2-acetyl-4-benzyloxymethyl-4-ethyl-2-methyl-1,3-dioxolane oxime sodium salt | | Calculated for $C_{16}H_{22}NO_4Na$<br>Found | 60.9<br>60.3 | 7.0<br>7.5 | 4.4<br>4.1 | |
| Ethyl 2-(5-benzyloxy-2,5-dimethyl-1,3-dioxan-2-yl)-2-hydroxyiminoacetate | 110–111 | Calculated for $C_{17}H_{23}NO_6$<br>Found | 60.5<br>59.1 | 6.9<br>6.8 | 4.2<br>4.2 | |
| 4-benzyloxymethyl-2,4-dimethyl-2-formyl-1,3-dioxolane oxime | Oil | Calculated for $C_{14}H_{19}NO_4$<br>Found | 63.4<br>63.4 | 7.2<br>7.4 | 5.3<br>5.4 | |
| 4-benzyloxymethyl-2,4-dimethyl-2-formyl-1,3-dioxolane oxime sodium salt | Oil | Calculated for $C_{14}H_{18}NO_4Na$<br>Found | 58.5<br>58.6 | 6.3<br>6.8 | 4.9<br>4.3 | |
| 4-benzyloxymethyl-2,4-dimethyl-2-(2-oxopropyl)-1,3-dioxolane oxime | Oil | Calculated for $C_{16}H_{23}NO_4$<br>Found | 65.5<br>65.9 | 7.9<br>8.1 | 4.8<br>4.7 | |
| 4-benzyloxymethyl-4-ethyl-2-formyl-2-methyl-1,3-dioxolane oxime | Oil | Calculated for $C_{15}H_{21}NO_4$<br>Found | 64.5<br>64.6 | 7.6<br>7.6 | 5.0<br>4.9 | |
| 4-benzyloxymethyl-2,4-dimethyl-2-formyl-1,3-dioxolane-o-methyloxime | Oil | Calculated for $C_{15}H_{21}NO_4$<br>Found | 64.5<br>65.9 | 7.6<br>7.8 | 5.0<br>4.9 | |

The soil used in the tests was a steam-sterilised, modified John Innes Compost mixture in which half the peat, by loose bulk, had been replaced by vermiculite.

The formulations used in the tests were prepared by diluting with water and solutions of the compounds in acetone containing 0.4% by weight of an alkylphenol-/ethylene oxide condensate available under the trade name Triton X-155. In the soil spray and foliar spray tests the acetone solutions were diluted with an equal volume of water and the resulting formulations applied at two dosage levels corresponding to 10 and 1 kilograms of active material per hectare respectively in a volume equivalent to 400 litres per hectare. In the soil drench tests one volume of the acetone solution was diluted to 155 volumes with water and the resulting formulation applied at one dosage level equivalent to 10 kilograms of active material per hectare in a volume equivalent to approximately 3,000 litres per hectare.

In the pre-emergence tests untreated sown soil and in the post-emergence tests untreated soil bearing seedling plants were used as controls.

The herbicidal effects of the compounds were assessed visually seven days after spraying the foliage and drenching the soil and eleven days after spraying the soil, and were recorded on a 0–9 scale. A rating 0 indicates no effect on the treated plants, a rating 2 indicates a reduction in fresh weight of stem and leaf of the plants of approximately 25%, a rating 5 indicates a reduction of approximately 55%, a rating 9 indicates a reduction of 95% etc.

The results of the tests are set out in Table 2.

TABLE 2

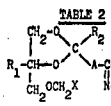

| COMPOUND | | | | | | DOSAGE kg/ha | POST-EMERGENCE | | | | | | | | | | | | | | PRE-EMERGENCE | | | | | | |
|---|---|---|---|---|---|---|---|---|---|---|---|---|---|---|---|---|---|---|---|---|---|---|---|---|---|---|---|---|
| $R_1$ | $R_2$ | $R_3$ | $R_4$ | X | A | | Soil Drench | | | | | | | Foliar Spray | | | | | | | | Soil Spray | | | | | | |
| | | | | | | | MZ | R | BG | P | L | M | SB | MZ | R | BG | P | L | M | SB | MZ | R | BG | P | L | M | SB |
| $C_2H_5$ | $CH_3$ | $CH_3$ | OH | $C_6H_5$ | Cov.bond | 10<br>1 | 7<br>4 | 7<br>3 | 7<br>2 | 0<br>0 | 0<br>0 | 2<br>0 | 1<br>0 | 7<br>4 | 5<br>3 | 6<br>2 | 0<br>0 | 0<br>0 | 9<br>0 | 8<br>0 | 3<br>0 | 9<br>8 | 9<br>9 | 9<br>9 | 2<br>0 | 2<br>0 | 0<br>0 | 7<br>0 |
| $C_2H_5$ | $CH_3$ | $CH_3$ | $OCONHC_2H_5$ | $C_6H_5$ | Cov.bond | 10<br>1 | 4<br>0 | 2<br>0 | 7<br>0 | 1<br>0 | 0<br>1 | 0<br>4 | 1<br>2 | 5<br>0 | 3<br>0 | 5<br>0 | 5<br>1 | 7<br>4 | 7<br>2 | 5<br>1 | 2<br>0 | 4<br>0 | 9<br>4 | 0<br>0 | 0<br>0 | 0<br>0 | 0<br>0 |
| $CH_3$ | $CH_3$ | $CH_3$ | OH | $C_6H_5$ (isomer A) | Cov.bond | 10<br>1 | 6<br>0 | 5<br>0 | 6<br>2 | 0<br>1 | 0<br>1 | 0<br>1 | 1<br>0 | 6<br>0 | 5<br>0 | 7<br>2 | 4<br>1 | 8<br>1 | 8<br>1 | 4<br>0 | 9<br>7 | 9<br>9 | 9<br>9 | 2<br>0 | 6<br>0 | 4<br>2 | 3<br>2 |
| $CH_3$ | $CH_3$ | $CH_3$ | OH | $C_6H_5$ (isomer B) | Cov.bond | 10<br>1 | 8<br>7 | 4<br>0 | 8<br>3 | 0<br>0 | 0<br>1 | 0<br>0 | 0<br>0 | 7<br>7 | 1<br>0 | 8<br>3 | 2<br>0 | 8<br>1 | 8<br>0 | 2<br>0 | 9<br>8 | 9<br>9 | 9<br>9 | 7<br>0 | 4<br>0 | 6<br>0 | 1<br>0 |
| $CH_3$ | $CH_3$ | $CH_3$ | $OCH_2C_6H_5$ | $C_6H_5$ | Cov.bond | 10<br>1 | 0<br>0 | 0<br>0 | 4<br>0 | 0<br>0 | 0<br>0 | 0<br>0 | 0<br>0 | 0<br>0 | 0<br>0 | 7<br>0 | 1<br>0 | 2<br>0 | 4<br>0 | 2<br>0 | 0<br>0 | 0<br>0 | 9<br>8 | 0<br>0 | 0<br>0 | 0<br>0 | 0<br>0 |
| $CH_3$ | $CH_3$ | $CH_3$ | $OCH_2C\equiv CH$ | $C_6H_5$ | Cov.bond | 10<br>1 | 8<br>0 | 0<br>0 | 8<br>0 | 0<br>0 | 0<br>0 | 0<br>.0 | 0<br>1 | 1<br>0 | 0<br>0 | 8<br>0 | 3<br>0 | 7<br>1 | 5<br>0 | 1<br>0 | 9<br>4 | 9<br>8 | 9<br>9 | 8<br>1 | 6<br>0 | 7<br>0 | 6<br>0 |
| $CH_3$ | $CH_3$ | $CH_3$ | $OCH_3$ | $C_6H_5$ | Cov.bond | 10<br>1 | 7<br>0 | 0<br>0 | 8<br>0 | 0<br>0 | 0<br>1 | 0<br>0 | 0<br>0 | 6<br>0 | 2<br>0 | 8<br>0 | 5<br>0 | 8<br>0 | 7<br>0 | 3<br>0 | 9<br>6 | 9<br>9 | 9<br>9 | 8<br>2 | 6<br>0 | 0<br>0 | 2<br>0 |
| $CH_3$ | $CH_3$ | $CH_3$ | $OCH_2CN$ | $C_6H_5$ | Cov.bond | 10<br>1 | 7<br>0 | 0<br>0 | 6<br>0 | 0<br>0 | 0<br>0 | 0<br>0 | 0<br>0 | 1<br>0 | 1<br>0 | 5<br>0 | 0<br>0 | 4<br>0 | 5<br>0 | .0<br>0 | 8<br>0 | 7<br>0 | 9<br>8 | 0<br>0 | 1<br>0 | 0<br>0 | 0<br>0 |

TABLE 2 – Continued

| COMPOUND | | | | | | Dosage kg/ha | POST-EMERGENCE | | | | | | | | | | | | | | PRE-EMERGENCE | | | | | | |
|---|---|---|---|---|---|---|---|---|---|---|---|---|---|---|---|---|---|---|---|---|---|---|---|---|---|---|---|---|
| | | | | | | | Soil Drench | | | | | | | Foliar Spray | | | | | | | Soil Spray | | | | | | | |
| $R_1$ | $R_2$ | $R_3$ | $R_4$ | X | A | | MZ | R | BG | P | L | M | SB | MZ | R | BG | P | L | M | SB | MZ | R | BG | P | L | M | SB |
| $CH_3$ | $CH_3$ | $COOC_2H_5$ | $OCONHCH_3$ | $C_6H_5$ | Cov.bond | 10 / 1 | 6 / 0 | 0 / 0 | 5 / 0 | 0 / 0 | 0 / 0 | 0 / 0 | 0 / 0 | 4 / 0 | 3 / 0 | 4 / 0 | 0 / 0 | 3 / 0 | 2 / 0 | 0 / 0 | 8 / 3 | 9 / 6 | 9 / 9 | 3 / 0 | 4 / 0 | 4 / 0 | 4 / 0 |
| $CH_3$ | $(CH_2)_3$ | | OH | $C_6H_5$ | Cov.bond | 10 / 1 | 7 / 0 | 3 / 0 | 7 / 0 | 0 / 0 | 0 / 0 | 0 / 0 | 0 / 0 | 4 / 0 | 2 / 0 | 7 / 7 | 1 / 9 | 9 / 9 | 9 / 0 | 3 / 0 | 9 / 0 | 9 / 7 | 9 / 9 | 6 / 0 | 4 / 0 | 4 / 0 | 1 / 0 |
| $CH_3$ | $CH_3$ | $COOC_2H_5$ | $OCONHCH_2CH=CH_2$ | $C_6H_5$ | Cov.bond | 10 / 1 | 5 / 0 | 0 / 0 | 6 / 0 | 0 / 0 | 0 / 0 | 0 / 0 | 0 / 0 | 6 / 0 | 0 / 0 | 6 / 2 | 2 / 0 | 4 / 1 | 0 / 0 | 0 / 0 | 8 / 0 | 9 / 0 | 9 / 0 | 5 / 0 | 5 / 0 | 0 / 0 | 0 / 0 |
| $CH_3$ | $CH_3$ | $COOC_2H_5$ | $OCONHC_6H_5$ | $C_6H_5$ | Cov.bond | 10 / 1 | 2 / 0 | 0 / 0 | 5 / 0 | 0 / 0 | 0 / 0 | 0 / 0 | 0 / 0 | 1 / 0 | 0 / 0 | 5 / 0 | 2 / 0 | 4 / 0 | 3 / 0 | 3 / 0 | 2 / 0 | 9 / 0 | 9 / 4 | 3 / 0 | 3 / 0 | 0 / 0 | 0 / 0 |
| $CH_3$ | $CH_3$ | $COOC_2H_5$ | OCONH-(2,6-diCl-phenyl) | $C_6H_5$ | Cov.bond | 10 / 1 | 0 / 0 | 0 / 0 | 3 / 0 | 0 / 0 | 0 / 0 | 0 / 0 | 0 / 0 | 2 / 0 | 3 / 0 | 8 / 0 | 1 / 0 | 9 / 4 | 9 / 1 | 8 / 0 | 2 / 0 | 9 / 2 | 8 / 2 | 0 / 0 | 4 / 0 | 3 / 0 | 3 / 0 |
| $C_2H_5$ | $CH_3$ | $CH_3$ | ONa | $C_6H_5$ | Cov.bond | 10 / 1 | 8 / 4 | 3 / 0 | 6 / 2 | 0 / 0 | 0 / 0 | 0 / 1 | 0 / 0 | 7 / 0 | 5 / 0 | 8 / 0 | 4 / 2 | 8 / 1 | 8 / 0 | 1 / 2 | 9 / 8 | 9 / 9 | 9 / 0 | 8 / 0 | 5 / 0 | 0 / 0 | 2 / 0 |
| $CH_3$ | $CH_3$ | H | OH | $C_6H_5$ | Cov.bond | 10 / 1 | 7 / 1 | 2 / 1 | 7 / 6 | 1 / 1 | 6 / 2 | 0 / 0 | 1 / 0 | 7 / 1 | 3 / 1 | 8 / 6 | 4 / 1 | 8 / 2 | 7 / 0 | 4 / 0 | 9 / 7 | 9 / 8 | 8 / 9 | 8 / 1 | 8 / 3 | 7 / 0 | 7 / 4 |
| $CH_3$ | $CH_3$ | H | ONa | $C_6H_5$ | Cov.bond | 10 / 1 | 7 / 0 | 0 / 0 | 7 / 0 | 1 / 2 | 1 / 1 | 0 / 4 | 0 / 2 | 5 / 0 | 2 / 0 | 8 / 0 | 4 / 0 | 8 / 9 | 8 / 3 | 3 / 0 | 8 / 0 | 8 / 0 | 9 / 9 | 5 / 3 | 3 / 0 | 0 / 0 | 0 / 0 |
| $CH_3$ | $CH_3$ | H | $OCH_3$ | $C_6H_5$ | Cov.bond | 10 / 1 | 8 / 1 | 1 / 0 | 7 / 3 | 1 / 1 | 6 / 3 | 0 / 0 | 0 / 0 | 7 / 1 | 2 / 0 | 8 / 3 | 5 / 1 | 8 / 3 | 7 / 3 | 5 / 0 | 9 / 7 | 9 / 8 | 8 / 5 | 4 / 0 | 7 / 0 | 3 / 0 | 0 / 0 |
| $CH_3$ | $CH_3$ | $CH_3$ | OH | $C_6H_5$ | $CH_2$ | 10 / 1 | 6 / 1 | 1 / 0 | 7 / 3 | 5 / 0 | 0 / 2 | 0 / 1 | 0 / 0 | 7 / 1 | 2 / 0 | 8 / 3 | 4 / 0 | 8 / 2 | 8 / 1 | 1 / 0 | 9 / 6 | 9 / 7 | 9 / 9 | 0 / 0 | 5 / 0 | 3 / 0 | 0 / 0 |
| $C_2H_5$ | $CH_3$ | H | OH | $C_6H_5$ | Cov.bond | 10 / 1 | 8 / 8 | 3 / 0 | 8 / 7 | 0 / 0 | 2 / 5 | 2 / 2 | 6 / 5 | 8 / 7 | 3 / 8 | 9 / 9 | 2 / 0 | 8 / 5 | 8 / 3 | 7 / 0 | 9 / 9 | 9 / 9 | 9 / 9 | 4 / 4 | 6 / 6 | 4 / 3 | 6 / 0 |
| $CH_3$ | $CH_3$ | H | $OCONHCH_3$ | $C_6H_5$ | Cov.bond | 10 / 1 | 7 / 0 | 0 / 0 | 7 / 5 | 2 / 0 | 0 / 2 | 0 / 1 | 0 / 0 | 7 / 0 | 2 / 0 | 8 / 5 | 3 / 0 | 8 / 2 | 9 / 1 | 3 / 0 | 8 / 3 | 8 / 2 | 9 / 9 | 7 / 1 | 3 / 0 | 5 / 0 | 6 / 0 |
| $CH_3$ | $CH_3$ | H | $OCH_2OCH_3$ | $C_6H_5$ | Cov.bond | 10 / 1 | 7 / 0 | 0 / 0 | 7 / 3 | 1 / 0 | 2 / 3 | 0 / 3 | 3 / 2 | 8 / 0 | 2 / 0 | 8 / 3 | 4 / 0 | 9 / 5 | 9 / 3 | 7 / 2 | 9 / 8 | 9 / 8 | 9 / 9 | 8 / 2 | 7 / 2 | 6 / 0 | 3 / 0 |
| $CH_3$ | $CH_3$ | $CH_3$ | $OCONHCH_3$ | $C_6H_5$ | $CH_2$ | 10 / 1 | 3 / 0 | 2 / 0 | 5 / 3 | 0 / 1 | 0 / 2 | 0 / 3 | 0 / 0 | 2 / 0 | 1 / 0 | 6 / 3 | 2 / 1 | 7 / 2 | 8 / 3 | 5 / 0 | 8 / 0 | 9 / 8 | 9 / 9 | 6 / 0 | 3 / 0 | 5 / 0 | 6 / 0 |
| $CH_3$ | $CH_3$ | H | $OCH_2CONHC_6H_5$ | $C_6H_5$ | Cov.bond | 10 / 1 | 3 / 0 | 0 / 0 | 8 / 0 | 2 / 1 | 0 / 0 | 0 / 0 | 0 / 0 | 1 / 0 | 0 / 0 | 7 / 0 | 2 / 1 | 4 / 0 | 2 / 0 | 4 / 0 | 5 / 2 | 5 / 4 | 9 / 8 | 3 / 0 | 7 / 0 | 0 / 0 | 0 / 0 |
| $CH_3$ | $CH_3$ | $CH_3$ | $OCH_3$ | $C_6H_5$ | $CH_2$ | 10 / 1 | 7 / 0 | 2 / 0 | 7 / 0 | 0 / 0 | 0 / 0 | 0 / 0 | 0 / 2 | 6 / 0 | 3 / 0 | 8 / 0 | 4 / 0 | 8 / 0 | 8 / 0 | 7 / 2 | 9 / 4 | 9 / 5 | 9 / 9 | 0 / 0 | 6 / 9 | 0 / 0 | 0 / 0 |
| $CH_3$ | $CH_3$ | $CH_3$ | OH | 2,6-dichloro-phenyl | Cov.bond | 10 / 1 | 6 / 0 | 5 / 0 | 7 / 0 | 0 / 0 | 0 / 0 | 0 / 1 | 2 / 0 | 2 / 0 | 2 / 0 | 4 / 0 | 1 / 0 | 4 / 0 | 6 / 1 | 2 / 0 | 8 / 6 | 9 / 8 | 9 / 3 | 3 / 0 | 5 / 0 | 3 / 0 | 7 / 0 |
| $CH_3$ | $CH_3$ | $CH_3$ | OH | 2-methyl-phenyl (isomer A) | Cov.bond | 10 / 1 | 6 / 3 | 6 / 2 | 6 / 4 | 0 / 1 | 2 / 2 | 0 / 2 | 2 / 1 | 3 / 3 | 3 / 2 | 5 / 4 | 2 / 1 | 5 / 2 | 8 / 2 | 4 / 1 | 9 / 8 | 9 / 9 | 9 / 0 | 0 / 1 | 5 / 0 | 3 / 1 | 2 / 1 |
| $CH_3$ | $CH_3$ | $CH_3$ | OH | 2-methyl-phenyl (isomer B) | Cov.bond | 10 / 1 | 6 / 0 | 6 / 0 | 6 / 0 | 0 / 0 | 0 / 0 | 0 / 0 | 0 / 0 | 2 / 0 | 2 / 0 | 6 / 3 | 2 / 0 | 7 / 1 | 9 / 1 | 8 / 0 | 6 / 0 | 8 / 0 | 9 / 0 | 4 / 0 | 3 / 0 | 1 / 0 | 3 / 0 |
| $CH_3$ | $CH_3$ | $CH_3$ | NH-(2,4-diNO2-phenyl) | $C_6H_5$ | Cov.bond | 10 / 1 | 0 / 0 | 0 / 0 | 0 / 0 | 0 / 0 | 0 / 0 | 0 / 0 | 0 / 0 | 2 / 0 | 2 / 0 | 5 / 0 | 1 / 0 | 7 / 3 | 2 / 0 | 1 / 0 | 0 / 0 | 0 / 0 | 7 / 0 | 0 / 0 | 0 / 0 | 0 / 0 | 0 / 0 |
| $CH_3$ | $CH_3$ | $CH_3$ | $N(CH_3)_2$ | $C_6H_5$ | Cov.bond | 10 / 1 | 4 / 1 | 3 / 0 | 6 / 0 | 0 / 0 | 0 / 5 | 0 / 0 | 0 / 0 | 7 / 1 | 3 / 0 | 8 / 0 | 5 / 0 | 9 / 5 | 9 / 0 | 3 / 0 | 7 / 1 | 9 / 9 | 9 / 2 | 3 / 0 | 5 / 0 | 7 / 0 | 4 / 0 |
| $CH_3$ | $CH_3$ | $CH_3$ | $NHCSNH_2$ | $C_6H_5$ | Cov.bond | 10 / 1 | 2 / 0 | 4 / 0 | 5 / 0 | 0 / 0 | 0 / 0 | 0 / 0 | 0 / 0 | 0 / 0 | 0 / 0 | 7 / 0 | 1 / 0 | 4 / 0 | 3 / 0 | 2 / 0 | 5 / 0 | 8 / 3 | 9 / 0 | 0 / 0 | 0 / 0 | 0 / 0 | 0 / 0 |
| $CH_3$ | $CH_3$ | $CH_3$ | $NHCOC_2H_5$ | $C_6H_5$ | Cov.bond | 10 / 1 | 6 / 0 | 6 / 0 | 7 / 0 | 0 / 0 | 0 / 0 | 0 / 0 | 0 / 0 | 0 / 0 | 0 / 0 | 8 / 0 | 2 / 0 | 4 / 0 | 3 / 0 | 2 / 0 | 7 / 1 | 9 / 6 | 9 / 5 | 7 / 3 | 0 / 0 | 0 / 0 | 0 / 0 |

We claim as our invention:

1. An oxime of one of the following isomeric formulae:

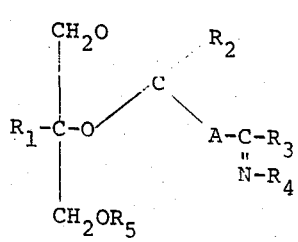

I

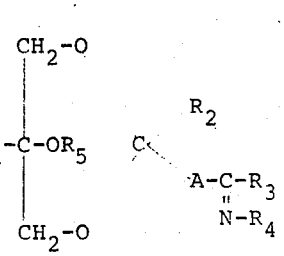

II wherein $R_1$ and $R_2$ each is alkyl of 1–6 carbon atoms; $R_3$ is a hydrogen atom or alkyl or alkoxycarbonyl each of up to 6 carbon atoms or phenyl, or $R_2$ and $R_3$ together represent polymethylene of up to 5 carbon atoms; $R_4$ is hydroxy or a sodium salt thereof, alkoxy of 1–6 carbon atoms optionally substituted by cyano, by alkoxy or alkoxycarbonyl each of up to 6 carbon atoms, or by N-phenylcarbamoyl, alkynyloxy or alkanoyloxy each of up to 6 carbon atoms, carbamoyloxy mono-N-substituted by alkyl or alkenyl each of up to 6 carbon atoms, or by dihalophenyl, benzyloxy, amino substituted by two alkyls each of 1–6 carbon atoms or by thiocarbamoyl, benzoyl or dinitrophenyl; $R_5$ is benzyl optionally substituted by two chlorine atoms or by alkyl of 1–6 carbon atoms; and A is a covalent bond or is methylene.

2. An oxime as defined in Formula II, claim 1, wherein $R_1$ and $R_2$ each is alkyl of 1–6 carbon atoms; $R_3$ is alkyl or alkoxycarbonyl each of up to 6 carbon atoms, or phenyl; $R_4$ is hydroxy; $R_5$ is benzyl; and A is a covalent bond.

3. An oxime as defined in Formula I, claim 1, wherein $R_1$ and $R_2$ each is a methyl or ethyl; $R_3$ is hydrogen or methyl, ethoxycarbonyl or phenyl; or $R_2$ and $R_3$ together represent trimethylene; $R_4$ is hydroxy or a sodium salt thereof, methoxy optionally substituted by cyano, methoxy, methoxycarbonyl or N-phenylcarbamoyl, propynyloxy or acetoxy, carbamoyloxy mono-N-substituted by methyl, ethyl, propenyl or dichlorophenyl, benzyloxy, or amino substituted by two methyls, or by thiocarbamoyl, benzoyl or dinitrophenyl; $R_5$ is benzyl optionally substituted by two chlorines or by methyl; and A is a covalent bond or is methylene.

4. An oxime as defined in Formula II, claim 1, wherein $R_1$ and $R_2$ each is methyl; $R_3$ is methyl, ethoxycarbonyl or phenyl; $R_4$ is hydroxy; $R_5$ is benzyl; and A is a covalent bond.

5. An oxime as defined in Formula I, claim 1, wherein $R_1$ is methyl, $R_2$ is methyl, $R_3$ is methyl, $R_4$ is hydroxy and $R_5$ is phenyl.

6. An oxime as defined in Formula I, claim 1, wherein $R_1$ is ethyl, $R_2$ is methyl, $R_3$ is methyl, $R_4$ is hydroxy and $R_5$ is phenyl.

7. An oxime as defined in Formula I, claim 1, wherein $R_1$ is methyl, $R_2$ is methyl, $R_3$ is methyl, $R_4$ is methoxy and $R_5$ is phenyl.

* * * * *